United States Patent
Allan et al.

(10) Patent No.: US 11,038,716 B2
(45) Date of Patent: Jun. 15, 2021

(54) USING LOCATION IDENTIFIER SEPARATION PROTOCOL TO IMPLEMENT A DISTRIBUTED GATEWAY ARCHITECTURE FOR 3GPP MOBILITY

(71) Applicant: Telefonaktiebolaget LM Ericsson (publ), Stockholm (SE)

(72) Inventors: David Ian Allan, San Jose, CA (US); Joel Halpern, Leesburg, VA (US); Srinivas Kadaba, Fremont, CA (US); Mohamed Elgendy, San Ramon, CA (US)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/480,298

(22) PCT Filed: Jan. 24, 2017

(86) PCT No.: PCT/IB2017/050364
§ 371 (c)(1),
(2) Date: Jul. 23, 2019

(87) PCT Pub. No.: WO2018/138544
PCT Pub. Date: Aug. 2, 2018

(65) Prior Publication Data
US 2020/0044892 A1    Feb. 6, 2020

(51) Int. Cl.
*H04W 36/00* (2009.01)
*H04L 12/46* (2006.01)
(Continued)

(52) U.S. Cl.
CPC ......... *H04L 12/4633* (2013.01); *H04L 12/66* (2013.01); *H04L 69/22* (2013.01); *H04W 8/08* (2013.01); *H04W 36/14* (2013.01)

(58) Field of Classification Search
CPC . H04W 36/0083; H04W 36/08; H04W 36/30; H04W 36/0061; H04W 36/22;
(Continued)

(56) References Cited

U.S. PATENT DOCUMENTS 8,879,394 B2    11/2014   Allan et al.
10,015,132 B1*   7/2018   Qin ..................... H04L 61/2084
(Continued)

FOREIGN PATENT DOCUMENTS

EP    2782372 A1    9/2014
EP    2858315 A1    4/2015
(Continued)

OTHER PUBLICATIONS

Atkinson, et al., "ICMP Locator Update message for ILNPv6; draft-irtf-rrg-ilnp-icmpv6-06.txt," IETF Internet Draft, Jul. 10, 2012, pp. 1-12.
(Continued)

*Primary Examiner* — Joseph Arevalo
(74) *Attorney, Agent, or Firm* — Sage Patent Group

(57) ABSTRACT

A method implemented by a network device in a cellular communication network with a distributed data plane serving gateway (S-GWu) at an evolved universal terrestrial radio access network (E-UTRAN) node B (eNodeB). The method enables an ingress tunnel router to forward traffic between devices connected to the cellular communication network via location identifier separation protocol (LISP) to enable mobility within the cellular communication network without anchor points.

12 Claims, 12 Drawing Sheets

(51) Int. Cl.
*H04L 12/66* (2006.01)
*H04L 29/06* (2006.01)
*H04W 8/08* (2009.01)
*H04W 36/14* (2009.01)

(58) Field of Classification Search
CPC . H04W 36/0055; H04W 48/20; H04W 36/14; H04W 88/06; H04W 24/02; H04W 84/045; H04W 36/00837; H04W 36/32; H04W 24/10; H04W 28/08; H04W 36/0016; H04W 36/0094; H04W 36/0005; H04W 36/0022; H04W 36/0072; H04W 36/0088; H04W 36/04; H04W 36/24; H04W 48/16; H04W 48/18; H04W 76/27; H04W 92/20; H04W 36/00835; H04W 36/00
USPC .......... 455/436, 437, 411, 6.1, 24, 405, 445, 455/550.1, 419, 450
See application file for complete search history.

(56) References Cited

U.S. PATENT DOCUMENTS

| | | | |
|---|---|---|---|
| 2001/0021175 | A1 | 9/2001 | Haverinen |
| 2004/0066745 | A1 | 4/2004 | Joe |
| 2004/0264374 | A1 | 12/2004 | Yu et al. |
| 2005/0007954 | A1 | 1/2005 | Sreemanthula et al. |
| 2005/0063307 | A1 | 3/2005 | Samuels et al. |
| 2006/0120288 | A1 | 6/2006 | Vasseur et al. |
| 2006/0155801 | A1 | 7/2006 | Brabson |
| 2009/0003214 | A1 | 1/2009 | Vaswani et al. |
| 2010/0208742 | A1 | 8/2010 | Kafle et al. |
| 2011/0002301 | A1 | 1/2011 | Chan et al. |
| 2012/0173694 | A1* | 7/2012 | Yan ............... H04L 61/103 709/223 |
| 2012/0180122 | A1* | 7/2012 | Yan ............... H04L 12/4633 726/15 |
| 2012/0320876 | A1 | 12/2012 | Zhou et al. |
| 2014/0112139 | A1 | 4/2014 | Allan et al. |
| 2014/0115135 | A1 | 4/2014 | Allan et al. |
| 2014/0189160 | A1 | 7/2014 | Haddad et al. |
| 2014/0226642 | A1 | 8/2014 | Haddad et al. |
| 2015/0156660 | A1 | 6/2015 | Luo et al. |
| 2015/0236954 | A1* | 8/2015 | Cheng ............ H04L 61/103 370/229 |
| 2016/0065531 | A1* | 3/2016 | Xiaopu .......... H04L 61/103 709/238 |
| 2016/0119159 | A1 | 4/2016 | Zhao et al. |
| 2016/0212778 | A1* | 7/2016 | Grootwassink ....... H04W 28/12 |
| 2018/0007604 | A1* | 1/2018 | Pillay-Esnault ...... H04L 65/104 |
| 2018/0279397 | A1 | 9/2018 | Faccin et al. |

FOREIGN PATENT DOCUMENTS

| | | |
|---|---|---|
| WO | 2015120902 A1 | 8/2015 |
| WO | 2017180335 A1 | 10/2017 |
| WO | 2018006017 A1 | 1/2018 |
| WO | 2018138545 A1 | 8/2018 |
| WO | 2018162947 A1 | 9/2018 |
| WO | 2018183740 A1 | 10/2018 |
| WO | 2018207006 A1 | 11/2018 |

OTHER PUBLICATIONS

Atkinson, et al., "ILNP Architectural Description; draft-irtf-rrg-ilnp-arch-06.txt," IETF Trust, Internet Draft, Jul. 10, 2012, pp. 1-53.
Atkinson, et al., "IPv6 Nonce Destination Option for ILNPv6; draft-irtf-rrg-ilnp-noncev6-06.txt," IETF Trust, Internet Draft, Jul. 10, 2012, pp. 1-14.
Atkinson, et al., "Optional Advanced Deployment Scenarios for ILNP; draft-irtf-rrg-ilnp-adv-00.txt," Internet Draft, IETF Trust, Jan. 12, 2012, pp. 1-25.
Bogineni, et al., "Optimized Mobile User Plane Solutions for 5G; draft-bogineni-dmm-optimized-mobile-user-plane-00.txt," Internet-Draft, Mar. 5, 2018, pp. 1-39.
Cabellos, et al., "An Architectural Introduction to the Locator/ID Separation Protocol (LISP); draft-ietf-lisp-introduction-13.txt," Internet Engineering Task Force, IETF Trust, Network Working Group, Internet-Draft, Apr. 2, 2015, pp. 1-27.
Cabellos, et al., "LISPmob: Mobile Networking through LISP," Dec. 14, 2011, retrieved from http://www.openoverlayrouter.org/lispmob/sites/default/files/users/user1/documents/LISPmob_Whitepaper.pdf on May 9, 2017, 8 pages.
Farinacci, et al., "LISP for the Mobile Network; draft-farinacci-lisp-mobile-network-04.txt," Internet Engineering Task Force, IETF Trust, Network Working Group, Internet-Draft, Sep. 11, 2018, pp. 1-24.
Gohar, et al., "A Seamless Handover Scheme in LISP Networks," 2013 International Conference on ICT Convergence (ICTC), IEEE, Oct. 14, 2013, 4 pages.
Hu, et al., "ID/Locator Distributed Mapping Server; draft-hu-lisp-dht-00.txt," Internet Engineering Task Force, Internet-Draft, Oct. 18, 2009, pp. 1-11.
Kurebayashi, et al., "Evolving 5G Routing," Sep. 21, 2017, pp. 1-17.
Moreno, et al., "Signal-Free LISP Multicast; draft-ietf-lisp-signal-free-multicast-01," Internet Engineering Task Force, IETF Trust, Network Working Group, Internet-Draft, Apr. 21, 2016, pp. 1-19.
Mueller, et al., "Mobility Management for 5G Network Architectures using Identifier-Locator Addressing; draft-mueller-ila-mobility-01.txt," Internet Engineering Task Force, IETF, Oct. 3, 2016, pp. 1-21.
RFC 6329: Fedyk, et al., "IS-IS Extensions Supporting IEEE 802.1aq Shortest Path Bridging," Internet Engineering Task Force (IETF), Request for Comments: 6329, Apr. 2012, 38 pages.
RFC 6740: Atkinson, et al., "Identifier-Locator Network Protocol (ILNP) Architectural Description," IETF Trust, Internet Research Task Force, Request for Comments: 6740, Nov. 10, 2012, pp. 1-53.
RFC 6741: Atkinson, et al., "Identifier-Locator Network Protocol (ILNP) Engineering Considerations," Internet Engineering Task Force, IETF Trust, Internet Research Task Force (IRTF), Request for Comments: 6741, Nov. 2012, pp. 1-38.
RFC 6742: Atkinson, et al., "DNS Resource Records for the Identifier-Locator Network Protocol (ILNP)," Internet Engineering Task Force, IETF Trust, Internet Research Task Force (IRTF), Request for Comments: 6742, Nov. 2012, pp. 1-20.
RFC 6743: Atkinson, et al., "ICMP Locator Update Message for the Identifier-Locator Network Protocol for IPv6 (ILNPv6)," Internet Engineering Task Force, IETF Trust, Internet Research Task Force (IRTF), Request for Comments: 6743, Nov. 2012, pp. 1-12.
RFC 6744: Atkinson, et al., "IPv6 Nonce Destination Option for the Identifier-Locator Network Protocol for IPv6 (ILNPv6)," Internet Engineering Task Force, IETF Trust, Internet Research Task Force (IRTF), Request for Comments: 6744, Nov. 2012, pp. 1-14.
RFC 6748: Atkinson, et al., "Optional Advanced Deployment Scenarios for the Identifier-Locator Network Protocol (ILNP)," Internet Engineering Task Force, IETF Trust, Internet Research Task Force (IRTF), Request for Comments: 6748, Nov. 2012, pp. 1-37.
RFC 6831: Farinacci, et al., "The Locator/ID Separation Protocol (LISP) for Multicast Environments," Internet Engineering Task Force (IETF), Request for Comments: 6831, Jan. 2013, pp. 1-28.
Rui, T., "Network Access Control Mechanism Based on Locator/Identifier Split," International Conference on Networking, Architecture, and Storage (NAS 2009), IEEE, Jul. 9, 2009, pp. 171-174.
Wijnands, et al., "Multicast using Bit Index Explicit Replication; draft-ietf-bier-architecture-04," Internet Engineering Task Force (IETF), Internet-Draft, Jul. 18, 2016, pp. 1-36.
Wijnands, et al., "Multicast using Bit Index Explicit Replication; draft-wijnands-bier-architecture-05," Internet Engineering Task Force, Internet-Draft, Mar. 6, 2015, pp. 1-30.

(56) References Cited

OTHER PUBLICATIONS

Fuller, et al., "LISP Delegated Database Tree, draft-ietf-lisp-ddt-08," IETF Trust, Network Working Group, Internet-Draft, Sep. 8, 2016, 37 pages.

* cited by examiner

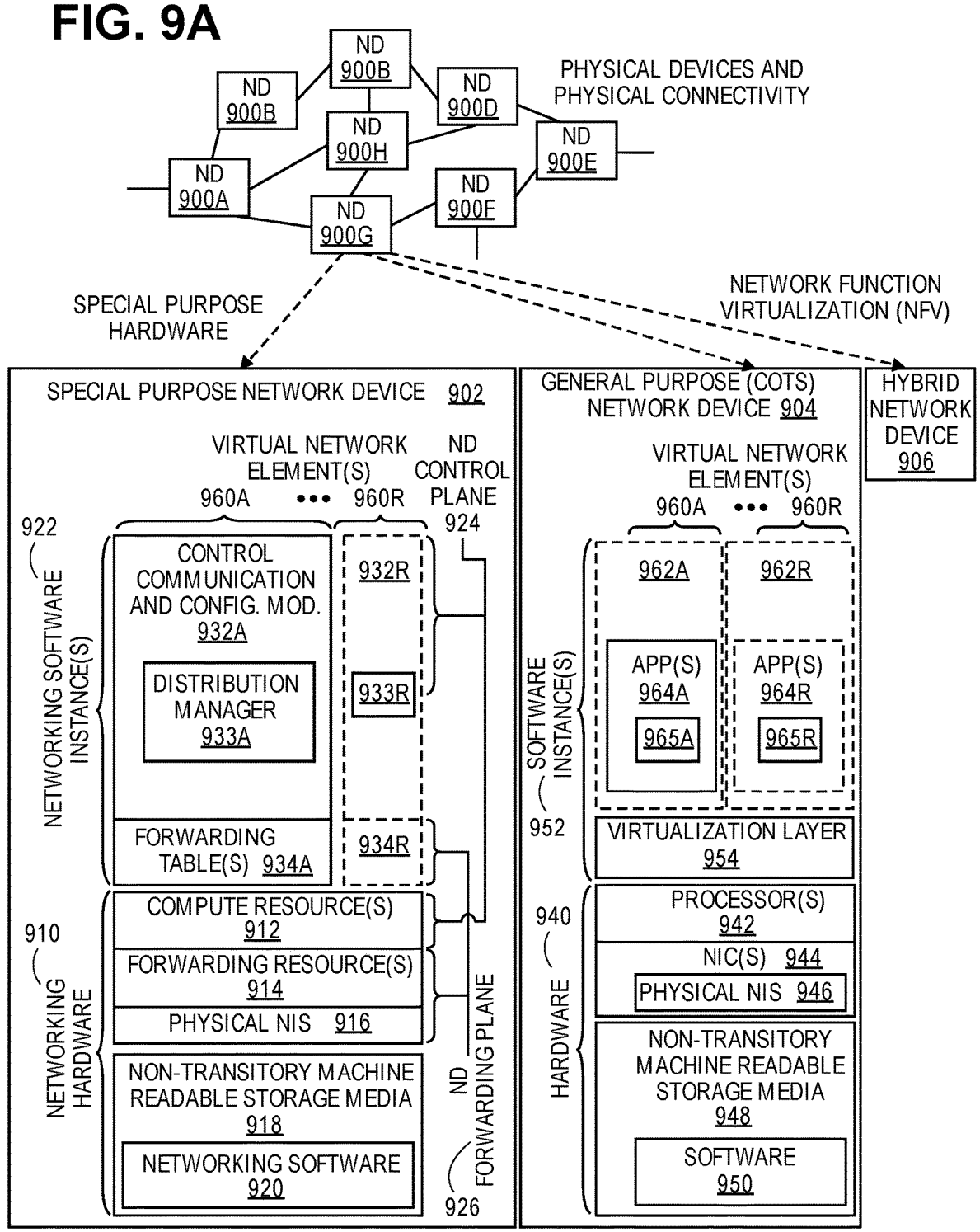

USING LOCATION IDENTIFIER SEPARATION PROTOCOL TO IMPLEMENT A DISTRIBUTED GATEWAY ARCHITECTURE FOR 3GPP MOBILITY

CROSS-REFERENCE TO RELATED APPLICATIONS

This application is a national stage of International Application No. PCT/IB2017/050364, filed Jan. 24, 2017, which is hereby incorporated by reference.

TECHNICAL FIELD

Embodiments of the invention relate to the field of $3^{rd}$ Generation Partnership Project (3GPP) mobility; and more specifically, to a method and system for using location identifier separation protocol (LISP) to enable a distributed gateway architecture to improve efficiency in a 3GPP network by eliminating inefficiency related to the use of anchor points.

BACKGROUND

Cellular communication networks enable user equipment (UE) 101, such as cellular phones and similar computing devices, to communicate using spread spectrum radio frequency communication. As shown in FIG. 1, the UE 101 communicates directly with a radio access network (RAN). The RAN includes a set of base stations such as evolved universal terrestrial radio access network (E-UTRAN) nodes, referred to as E-UTRAN node B or eNodeB 103. FIG. 1 is a diagram of an example architecture for a cellular communication system consistent with 3GPP standardized cellular communication architecture including an example UE 101 communicating with a eNodeB 103 of the network. The eNodeB 103 interfaces with a packet core network or evolved packet core (EPC) 115 that connects the UE to a packet data network via which the UE can communicate with other devices in the cellular communication network and with devices external to the cellular communication network.

The EPC 115 and its components are responsible for enabling communication between the UE 101 and other devices both internal and external to the cellular communication system. The EPC 115 includes a serving gateway (S-GW) 105, a packet gateway (P-GW) 107, a mobility management entity (MME) 109 and similar components. Additional components are part of the EPC 115 (e.g., a home subscriber server (HSS)), but the components with less relevance to the handling of the UE 101 and its mobility have been excluded for clarity and to simplify the representation. The UE 101 may change the eNodeB 103 through which it communicates with the network as it moves about geographically. The MME 109, S-GW 105 and P-GW 107 coordinate to facilitate this mobility of the UE 101 without interruption to any ongoing telecommunication session of the UE 101.

The MME 109 is a control node that, among other duties, is responsible for determining a S-GW 105 that the UE 101 is to communicate with at attach time and when handovers between eNodeBs 103 in the RAN occur. The MME 109 has other responsibilities including idle mode communication with the UE 101, which includes paging and text retransmissions.

The S-GW 105 and the P-GW 107 provide anchor points for a UE 101 enabling various types of transitions that facilitate the mobility of the UE 101 without the UE losing connections with other devices. The S-GW 105 routes and forwards data to and from the UE 101 while functioning as a mobility anchor point for the UE 101 handovers between eNodeBs 103 and between long term evolution (LTE) and other 3GPP technology. The P-GW 107 provides connectivity between the UE 101 and external data packet networks by being a fixed anchor point that offers the UE's Internet Protocol (IP) address into a routable packet network. The S-GW and P-GW may belong to a common operator, or different operators depending on whether the UE is currently being served by a home or visited network.

As shown in the example simplified network of FIG. 1, a UE 101 communicates with the EPC 115 via the eNodeB 103 and reaches a correspondent 113, or 121 via P-GW 107. In this example, the traffic from the UE 101 would traverse the connected eNodeB 103, the S-GW 105, and P-GW 107, to reach a correspondent 113. If the correspondent is a mobile device, the path to that correspondent may also traverse a P-GW, S-GW and eNodeB which are also subtended to the common packet data network. The correspondents 113, 121 can be any device capable of receiving the traffic from the UE 101 and sending traffic to the UE 101 including cellular phones, computing devices and similar devices that may be connected through any number of intermediate networking or computing devices.

SUMMARY

In one embodiment, a method is implemented by a network device in a cellular communication network with a distributed data plane serving gateway (S-GWu) at an evolved universal terrestrial radio access network (E-UTRAN) node B (eNodeB). The method is to enable an ingress tunnel router to forward traffic between devices connected to the cellular communication network via location identifier separation protocol (LISP) to enable mobility within the cellular communication network without anchor points. The method includes receiving a packet originating from a first device, determining whether the received packet is General packet radio service (GPRS) tunneling protocol (GTP)-user plane (GTP-U) encapsulated, retrieving an endpoint identifier (EID) of a destination address of a nested header of the received packet, where the received packet is determined to be GTP-U encapsulated, resolving a routing locator (RLOC) of the retrieved EID, encapsulating the packet with LISP using the RLOC, and forwarding the packet via LISP to an egress tunnel router.

In another embodiment, another method is implemented by another network device in the cellular communication network with the distributed S-GWu at an eNodeB. The method is to enable an ingress tunnel router to forward traffic between devices connected to the cellular communication network via LISP to enable mobility within the cellular communication network without anchor points. The method includes receiving a packet originating from a first device via the distributed S-GWu, retrieving an EID of a destination address of the packet from a header of the received packet, resolving a RLOC of the retrieved EID, encapsulating the packet with LISP using the RLOC, and forwarding the packet via LISP to an egress tunnel router.

In a further embodiment, a further network device is in the cellular communication network with the distributed S-GWu at an eNodeB. The network device executes a method to enable an ingress tunnel router to forward traffic between devices connected to the cellular communication network via LISP to enable mobility within the cellular communication network without anchor points. The network device includes a non-transitory computer-readable medium having stored therein a distribution manager, and a processor coupled to the non-transitory computer-readable medium. The processor executes the distribution manager. The distribution manager receives a packet originating from a first device, determines whether the received packet is GTP-U encapsulated, retrieves an EID of a destination address of a nested header of the received packet, where the received packet is determined to be GTP-U encapsulated, resolves a RLOC of the retrieved EID, encapsulates the packet with LISP using the RLOC, and forwards the packet via LISP to an egress tunnel router.

In one embodiment, a network device is in the cellular communication network with a distributed S-GWu at an eNodeB. The network device executes a method to enable an ingress tunnel router to forward traffic between devices connected to the cellular communication network via LISP to enable mobility within the cellular communication network without anchor points. The network device includes a non-transitory computer-readable medium having stored therein a distribution manager, and a processor coupled to the non-transitory computer-readable medium. The processor executes the distribution manager, the distribution manager receives a packet originating from a first device via the distributed S-GWu, retrieves an EID of a destination address of the packet from a header of the received packet, resolves a RLOC of the retrieved EID, encapsulates the packet with LISP using the RLOC, and forwards the packet via LISP to an egress tunnel router.

BRIEF DESCRIPTION OF THE DRAWINGS

The invention may best be understood by referring to the following description and accompanying drawings that are used to illustrate embodiments of the invention. In the drawings:

FIG. 9A illustrates connectivity between network devices (NDs) within an exemplary network, as well as three exemplary implementations of the NDs, according to some embodiments of the invention.

FIG. 9B illustrates an exemplary way to implement a special-purpose network device according to some embodiments of the invention.

DETAILED DESCRIPTION

Figure 1:
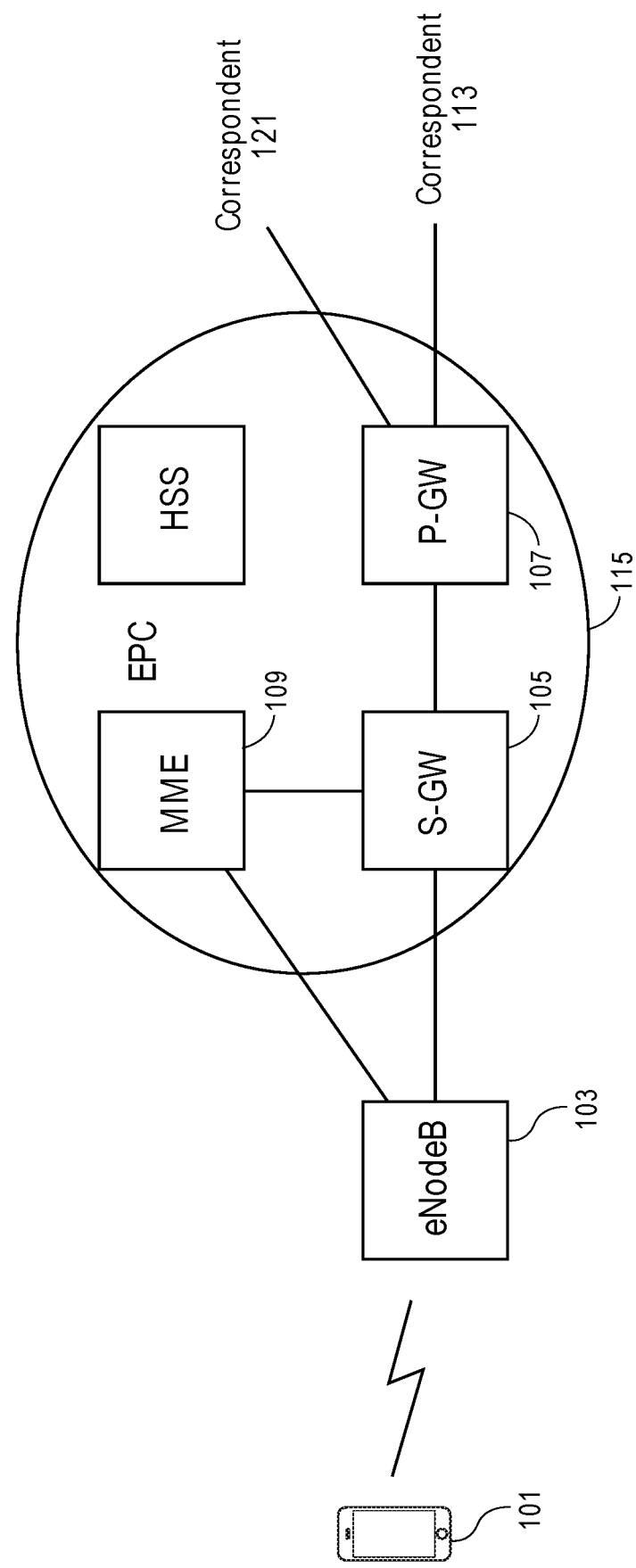
FIG. 1 is a diagram of one embodiment of a 3GPP network architecture.

The following description sets forth methods and system for improving the efficiency of bandwidth utilization in $3^{rd}$ Generation Partnership Project (3GPP) architecture networks. More specifically, the embodiments provide a method and system for using location identifier separation protocol (LISP) to enable a distributed gateway architecture to improve efficiency in a 3GPP network by eliminating inefficiency related to the use of anchor points. The 3GPP architecture and the geographic placement of its components is driven by both technical and business considerations and requires specific functionalities and functional distributions to be carried forward in any update to the architecture. The embodiments provide improved efficiency while preserving the key functionalities of the 3GPP architecture.

The specific inefficiencies in the 3GPP architecture that are addressed include the functions of the serving gateway (S-GW) and the packet gateway (P-GW) when serving as anchor points. A mobile carrier will typically deploy a very small number of P-GW sites nationally, hence these gateways are often located at a significant distance from a radio access network (RAN) and its constituent components such as the evolved universal terrestrial radio access network (E-UTRAN) nodes, referred to as E-UTRAN node B or eNodeB. Yet, traffic from a user equipment (UE) must traverse the S-GW and/or P-GW before reaching a correspondent device, which if it is another mobile terminal may only be reached by the P-GW and S-GW serving the correspondent. The traffic to the S-GW and P-GW is tunneled to these devices and due to their distant location, bandwidth usage inefficiency is introduced into the communication system. The embodiments address this problem by introducing distributed user or data plane functions for the S-GW and/or the P-GW that enable these functions to be located at or near the eNodeB that enable much of the traffic to avoid being tunneled to the distant S-GW and P-GW. The embodiments also utilize identifiers/locator separation and mapping systems technology to enable the separation and distribution. Centralized control functions associated with the distributed GWs facilitate interworking with the existing 3GPP deployments while hiding the distributed nature of the GW data plane implementation.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

LISP is routing technology that provides alternate semantics for Internet Protocol (IP) addressing. This is achieved via the tunneling of identity information, i.e., endpoint identifier (EID), between tunnel routers identified by routing locators (RLOCs). The on-the-wire format is a variation of IP in IP tunneling with simply different semantics associated with the IP addresses located at different points in the stack. Each of these values, the EID and RLOC, have separate address or numbering spaces. Splitting EID and RLOC enables a device to change locations within a LISP network without the identity of the device changing and therefore associated session state (e.g. transmission control protocol (TCP) or IP security (IPSEC)) remains valid independent of the EID's actual point of attachment to LISP network.

The embodiments utilize LISP to avoid the limitations of anchor points in the 3GPP architecture. The S-GW and P-GW in the 3GPP architecture are anchor points that also implement specific functionalities not easily dispensed with as they address business and regulatory requirements. The embodiments split the data or user plane functions of each gateway from the control plane functions by recognizing that the data plane functions can be distributed without changing key aspects of the 3GPP architecture if the control plane functions remained in the centralized or invariant location. As used herein, the terms "data plane functions" and "user plane functions" are interchangeable. These functions of the serving gateway and the packet gateway are referred to herein as the S-GWu and P-GWu functions, respectively, while the control plane functions are referred to as the S-GWc and P-GWc functions. An S-GW may therefore be implemented as an S-GWc function that controls a constellation of distributed S-GWu's.

With this distribution of the data plane functions, LISP can be utilized to mask the mobility of the data plane gateway functions associated with an individual UE's packet data network (PDN) session/connections from other components of the 3GPP architecture and from the correspondent. Thus, the embodiments provide a distribution of the data plane functions in the form of the S-GWu and P-GWu. The processes in particular set forth herein relate to the operation of tunnel routers (TRs), which implement the LISP forwarding that enable the masking of the UE and correspondent locations and facilitating mobility where distributed S-GWu's and/or P-GWu's are utilized.

Figure 2:
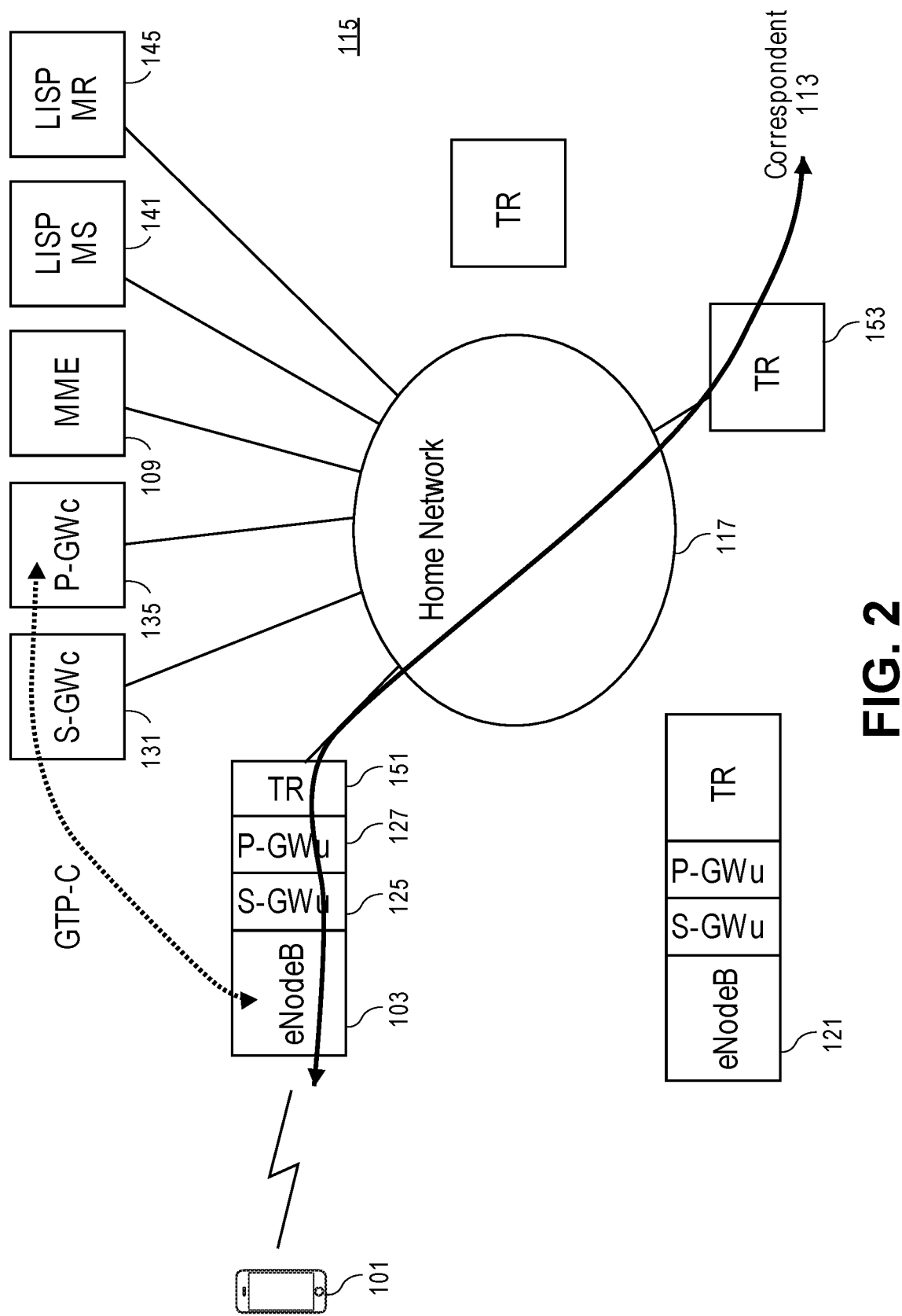
FIG. 2 is a diagram of one embodiment of an enhanced 3GPP network architecture with distributed S-GWs and P-GWs.

FIG. 2 is a diagram of one embodiment of a 3GPP network architecture with distributed S-GWs and P-GWs. In this example illustrated embodiment, the S-GWu 125 and P-GWu 127 are co-located with an eNodeB 103, such that a UE 101 being served by a home network 117 can connect to the network via the S-GWu 125 and P-GWu 127 functions at or near the eNodeB 103. This is facilitated by TRs 151, 153 that forward the data traffic between a UE 101 and correspondent 113 using LISP. This remains true where the UE 101 may move to connect to another eNodeB 121. The UE 101 could move from a source eNodeB 103 to a target eNodeB 121 without interruption to the communication session with the correspondent 113. The state of the S-GWu and/or P-GWu can be transferred or synchronized between the GW instances at the source eNodeB 103 and those at the target eNodeB 121. Any method or process for coordinating the transfer of state and related configuration data from the source eNodeB 103 to the target eNodeB 121 can be utilized.

In this example, functions of both the S-GW and the P-GW are distributed. However, one skilled in the art would understand that this configuration is provided by way of example and not limitation. The distribution of the functions of the S-GW and P-GW in combination with the use of LISP can be utilized in other configurations where different permutations of the functions are distributed. The key scenarios of interest being both the P-GW and S-GW user plane components being distributed (home network scenario), and the S-GW user plane is distributed, and the P-GW is remote (a typical visited network scenario). Further examples illustrating some of the variations are described herein below with reference to FIGS. 3-5.

Returning to the discussion of FIG. 2, the control plane functions of the S-GW and P-GW, referred to as S-GWc 131 and P-GWc 135, respectively, remain in the EPC 115. Similarly, the MME 109 remains in the EPC 115 and continues to perform the same functions. The EPC 115 has been augmented with a LISP map server (MS) 141 and a LISP map resolver (MR) 145. The LISP MS 141 manages a database of EID and RLOC mappings that are determined from communication with TRs 151, 153. The LISP MS 141 receives EID information about connected devices from TRs 151, 153 that are stored in the database and associated with the respective TRs 151, 153. Similarly, the LISP MR 145 handles map requests from the TRs 151, 153 when serving as ingress TRs and uses the database to find an appropriate egress TR to reach a destination EID. Thus, these components enable the distributed mobility of the S-GWu 125 and P-GWu 127 along with the use of TRs 151, 153.

The distributed S-GWu and/or P-GWu can be instantiated at each eNodeB with a logically separate instance for each connected UE 101. Thus, the state and similar configuration are specific to the UE 101 and can be transferred or shared with other instances at other eNodeBs to facilitate handover operations. All S-GWu and/or P-GWu instances are controlled by S-GWc and P-GWc instances. Each such control instance may control one or several corresponding data plane instances. This enables the controllers to coordinate amongst the data plane instances while preserving the external appearance and interfaces of a single monolithic gateway.

Figure 3:
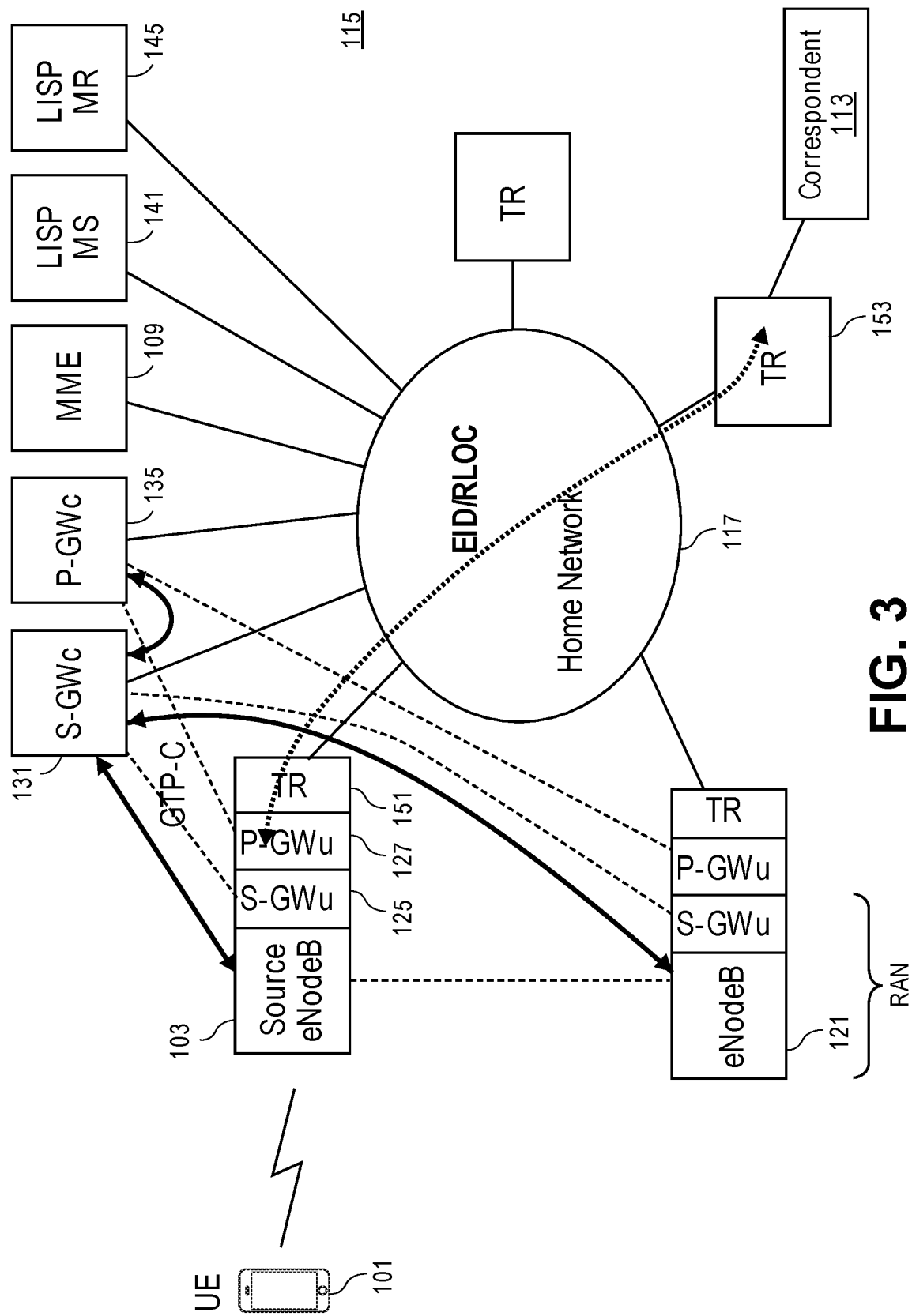
FIG. 3 is a diagram of one embodiment of an enhanced 3GPP network architecture with data traffic flows when a UE is connected to a home network.

FIG. 3 is a diagram of one embodiment of a 3GPP network architecture with data traffic flows when a UE is connected to a home network. General packet radio service (GPRS) tunneling protocol (GTP) is utilized to carry data and control information from an eNodeB to the EPC. GTP-C is utilized to manage tunnels and control plane traffic between the MME, the S-GW and P-GW whereas GTP-U is normally utilized to convey data/user plane traffic from an eNodeB to a S-GW and ultimately to a P-GW. In the illustrated embodiment, the eNodeB, S-GWu and P-GWu have been collapsed into a single node, hence there is no actual GTP-U component.

A UE 101 served by a home network 117 is shown. The UE 101 is connected to a source eNodeB 103 that may have co-located S-GWu 125 and P-GWu 127 as well as a TR 151. GTP-C (solid line) is utilized to communicate control plane information between the source eNodeB and the S-GWc and other EPC components (not illustrated) as well as between the S-GWc and the P-GWc. LISP routing (dotted line) is used to send the data plane traffic across the EPC from an ingress TR 151 to an egress TR 153 to enable communication between the UE 101 and the correspondent 113. In the event of a handover from a source eNodeB 103 to a target eNodeB 121, GTP-C may be utilized to coordinate the transfer or synchronization of state from the source eNodeB 103, S-GWu 125 and P-GWu 127 to the target eNodeB 121, and associated S-GWu and P-GWu.

In the example, the TR co-located with the P-GWu determines the RLOC serving the correspondent, which may be the egress TR. The RLOC may be determined using the destination EID from the data traffic by contacting the LISP MR. After a transfer of the UE 101 to a target eNodeB 121, the local instance of the P-GWu will similarly use the destination EID to forward the traffic via the local TR to the egress TR 153 without interruption.

Figure 4:
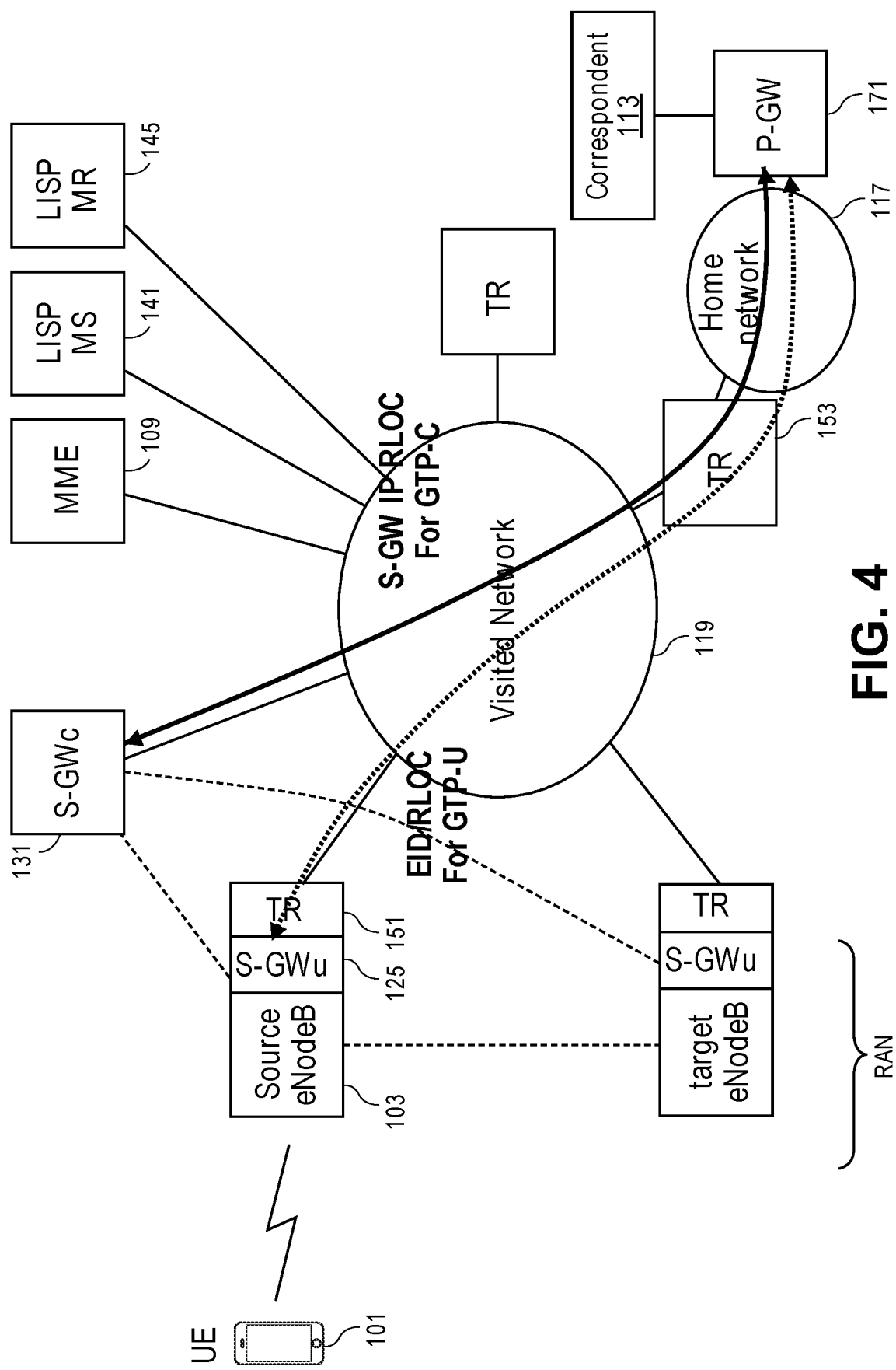
FIG. 4 is a diagram of one embodiment of an enhanced 3GPP network architecture with data traffic flows when a UE is connected to a visited network.

FIG. 4 is a diagram of one embodiment of a 3GPP network architecture with data traffic flows when a UE is connected to a visited network 119. In this example scenario, the S-GWc 131 communicates control GTP messages to a P-GW 171 in a home network 117. The S-GWu and ingress TR 151 communicate with the egress TR 153 across the visited network 119 to reach the home network 117 and correspondent 113. The home network P-GW 171 may be implemented as a monolithic entity or may be distributed in the fashion of the visited network. The ingress TR 151 resolves the EID of the remote P-GW 171 via the LISP mapping system in order to determine the RLOC of the egress TR 153. In this scenario, a local P-GWu is not needed and/or utilized at the attached eNodeB 103 for the particular PDN session.

Figure 5:
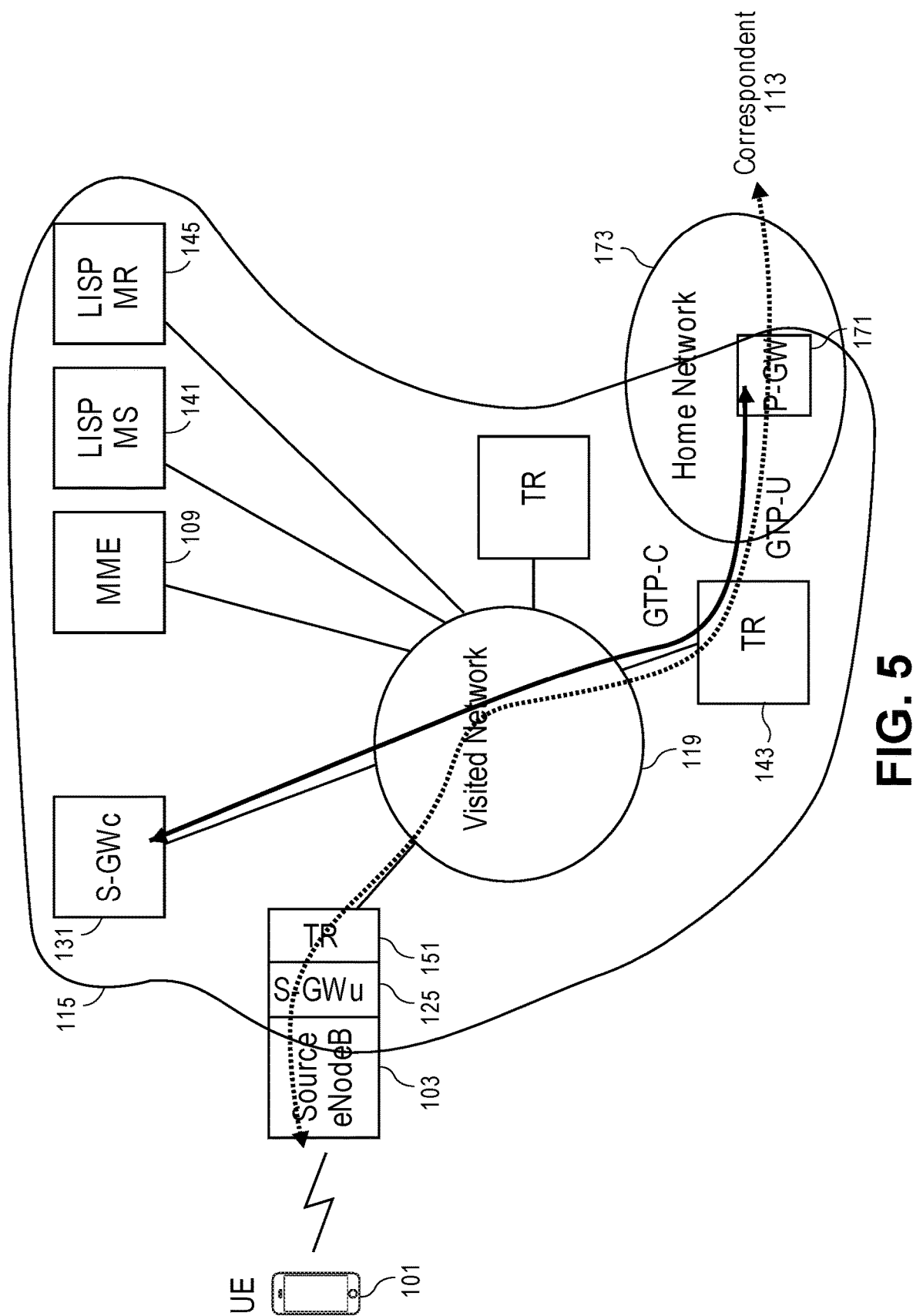
FIG. 5 is a diagram of another embodiment of an enhanced 3GPP network architecture with data traffic flows when a UE is connected to a visited network.

FIG. 5 is a diagram of another embodiment of a 3GPP network architecture with data traffic flows when a UE 101 is connected to a visited network. In this embodiment LISP is not used for the visited network scenario, such that the overhead of both GTP and LISP tunneling is not incurred. Thus, as illustrated, GTP-U is used between the UE 101 and the correspondent 113, and the S-GWc 131 of the visited network communicates with the P-GW 171 of the home network 173 via GTP-C. The TRs 151 and 143 do not LISP encapsulate this traffic in this case. This embodiment may be used where some network devices do not support LISP or in similar scenarios.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Figure 6A:
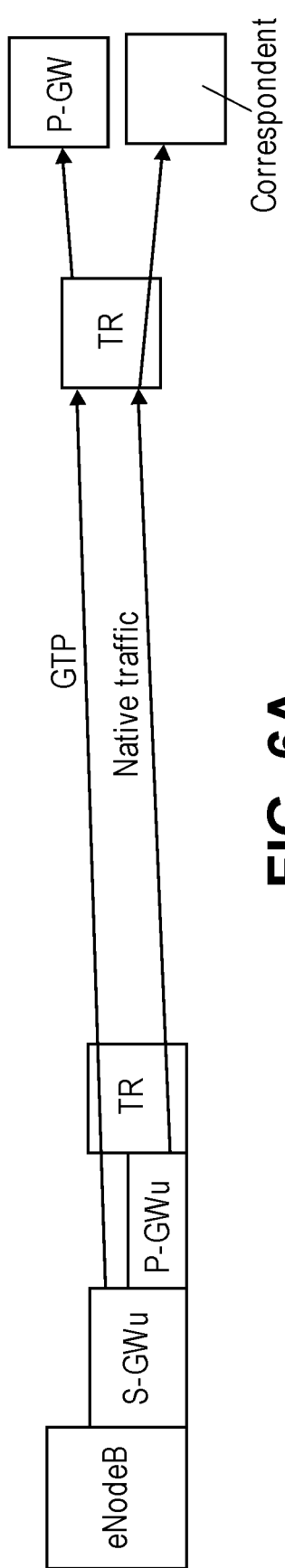
FIG. 6A is a diagram of one embodiment of traffic flow where a tunnel router (TR) is an egress for outbound traffic.

FIG. 6A is a diagram of one embodiment of traffic flow where a tunnel router (TR) is an egress for outbound traffic. GTP-U traffic is examined for its destination by the S-GWu to determine an EID/RLOC for a destination and passed to the ingress TR to be forwarded to the associated egress TR. Similarly, native traffic, e.g., IP traffic, may be forwarded by use of an associated EID/RLOC for a destination address by the P-GWu via the ingress TR and egress TR. GTP traffic is routed to a remote P-GW where the destination is not in the home network, whereas native traffic is routed to the correspondent in the home network.

Figure 6B:
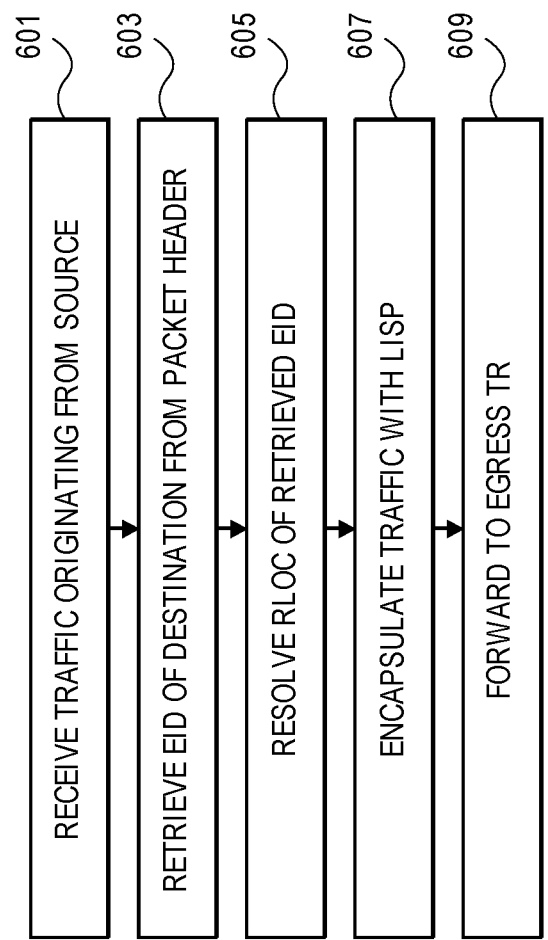
FIG. 6B is a flowchart of one embodiment of a process of the TR to facilitate communication between a UE and a correspondent.

FIG. 6B is a flowchart of one embodiment of a process of the TR to facilitate communication between a UE and a correspondent. The process is implemented by the ingress/local TR at the eNodeB that is coupled to the UE. There are two scenarios affecting the processing of traffic from the UE. In the first scenario, the S-GW is distributed and split into the S-GWu and S-GWc, while the P-GW is not split. In the second scenario, both the S-GW and the P-GW are split and distributed.

The process of the TR begins in response to the receiving of traffic originating at the UE or similar source (Block 601). The traffic may have passed through the S-GWu and/or P-GWu. The TR examines the packet header, which may be either an encapsulating GTP header or a native header (e.g., an IP header) and from that determines the destination EID for the packet (Block 603). The TR determines an RLOC by querying the LISP MR or similar service to determine the egress TR for the destination (Block 605).

The received packet is then encapsulated in a LISP packet where the LISP header is added to the received packet and the encapsulated packet is forwarded in an IP packet addressed to the destination RLOC (Block 607). The encapsulated packet can then be forwarded over the core network that implements LISP, or a similar LISP network toward the destination (Block 609). The destination is reached via the egress TR and may be a correspondent or a P-GW where the destination is outside the attached network.

In an alternate embodiment, the same two scenarios affect the forwarding of the received data traffic by the ingress TR. In the first scenario, the S-GW is distributed, but the P-GW is not distributed. In the second scenario, the S-GW and the P-GW are distributed. In the first scenario, the S-GWu sends GTP encapsulated traffic to the remote P-GWs bypassing the ingress TR. In the second scenario, the ingress TR receives native IP traffic from the distributed S-GW/P-GW and resolved the destination IP address of the traffic to an RLOC for forwarding via LISP by encapsulating the packet with the LISP header and forwarding the packets with an IP packet addressed to the destination RLOC.

Figure 7A:
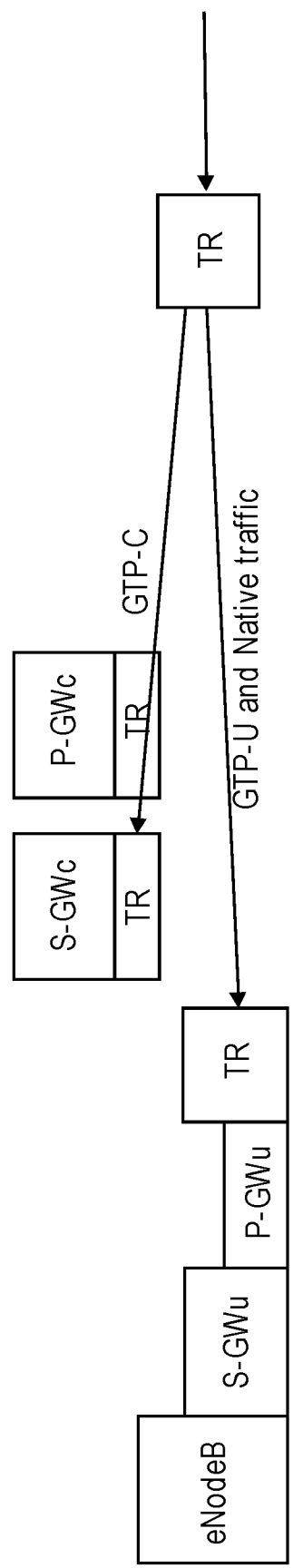
FIG. 7A is a diagram of one embodiment of traffic flow where the TR is an ingress for incoming traffic.

FIG. 7A is a diagram of one embodiment of traffic flow where a TR is an ingress for incoming traffic. In this case the ingress TR is sending traffic toward the UE from a correspondent or similar source. The traffic received by the ingress TR may be identified as either data traffic or control traffic. Non GTP traffic has an outer header with a destination EID in the destination address that is mapped to an RLOC. This traffic is encapsulated by the ingress TR to be forwarded via LISP. GTP-C traffic is delivered as is, subject to normal internet service provider (ISP) filtering policies, without any use of LISP. GTP-U traffic received at the TR has an EID located in an inner header that is resolved to determine the correct RLOC.

Figure 7B:
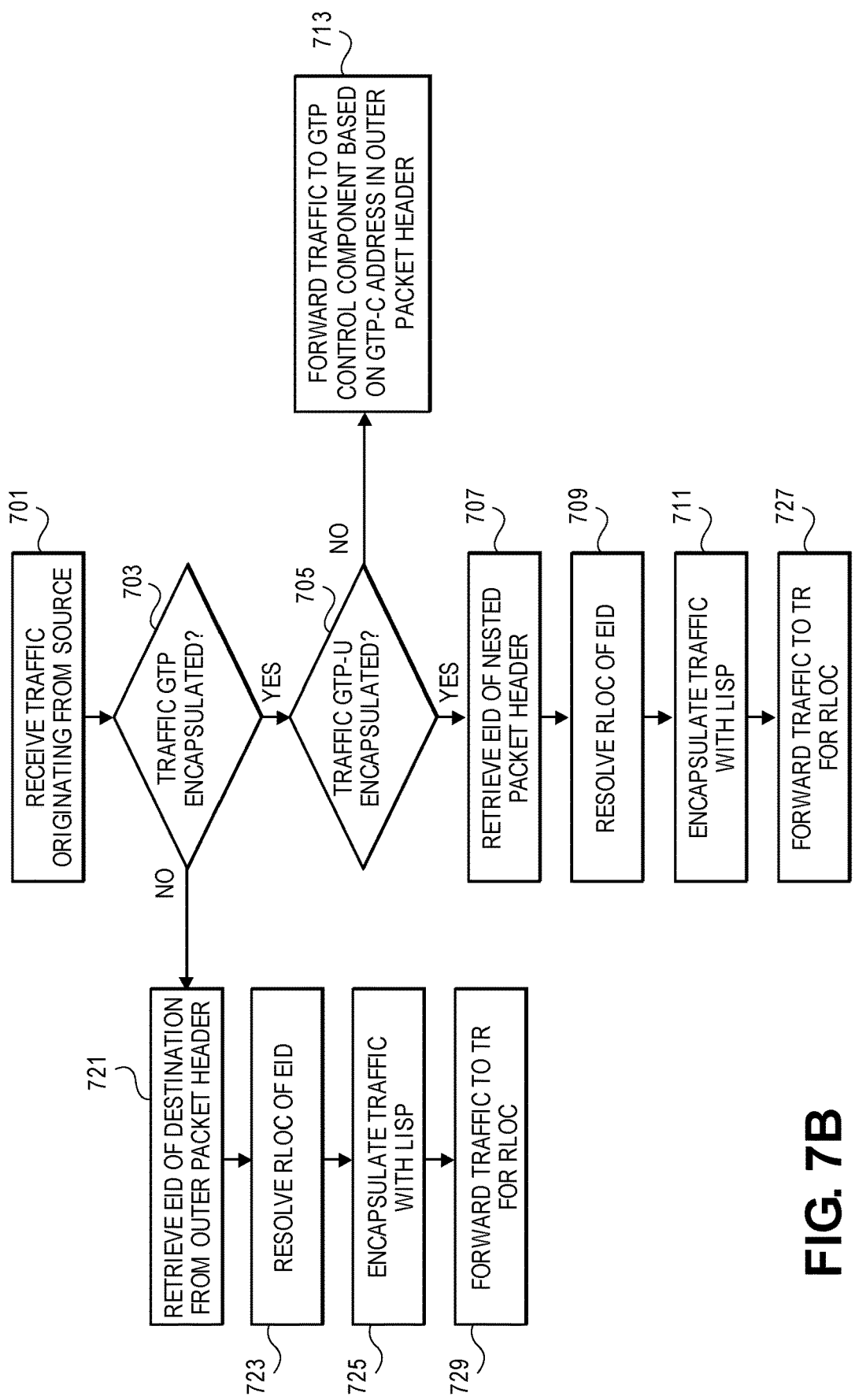
FIG. 7B is a flowchart of one embodiment of a process of the TR to facilitate communication between a UE and a correspondent.

FIG. 7B is a flowchart of one embodiment of a process of an ingress TR to facilitate communication between a UE and a correspondent. The process is initiated when traffic is received originating from the correspondent or similar source (Block 701). The received traffic is examined to determine whether it is GTP encapsulated traffic (Block 703).

If the received traffic is not GTP encapsulated, then it is native (e.g., IP) traffic. In this case, the destination address in the packet header is the EID to use for further processing (Block 721). The destination EID is resolved to determine the RLOC of the egress TR (Block 723). The ingress TR may LISP encapsulate the traffic (Block 725). The traffic is then forwarded via LISP to the egress TR (Block 729), which then passes the traffic on to the P-GWu and/or the S-GWu to be forwarded to the UE.

If the received traffic is GTP encapsulated, then a determination is made whether it is GTP-C or GTP-U encapsulated (Block 705). If the traffic is GTP-C encapsulated, then it is to be forwarded to the GTP control components based on the GTP-C address. This is the outer IP address and the packet can be forwarded according to the service provider's forwarding and filtering policies without any use of LISP (Block 713).

If the traffic is GTP-U encapsulated, then the process extracts the destination address from the nested header, i.e., the header of the packet encapsulated in the payload of the GTP-U packet (Block 707). The correlated EID of the destination is then determined and used to resolve the RLOC (Block 709). The EID/RLOC is then used to LISP encapsulate the traffic (Block 711) and then to forward the traffic to the egress TR (Block 727).

Figure 8:
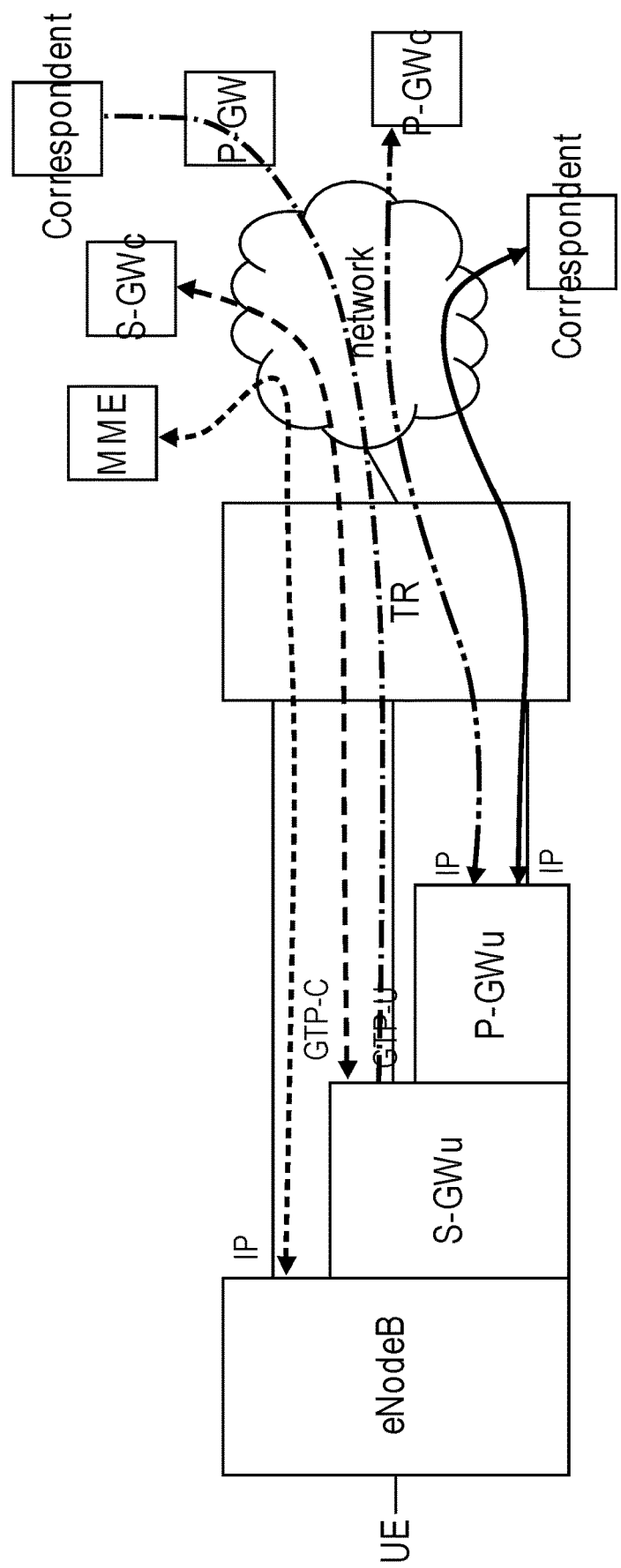
FIG. 8 is a diagram of one embodiment showing the communication routes and types between the components of the network.

FIG. 8 is a diagram of one embodiment showing the communication routes and types between the components of the network. The illustration shows that a TR co-located with distributed S-GWu and P-GWu at an eNodeB may see inbound traffic that may be addressed to any of three entities. Non-GTP traffic is addressed to a UE's EID, which is delivered to the P-GWu component. GTP-U encapsulated traffic addressed to the S-GWc EID is delivered to the S-GWu component. GTP control traffic addressed to the eNodeB's EID is delivered to the eNodeB. The three entities may communicate with any of a P-GW, S-GWc, P-GWc, MME, correspondent or similar entities. Communication between the eNodeB and MME may be via IP or similar protocol. The S-GWu may communicate with the S-GWc or a correspondent using GTP-C or GTP-U, respectively, with LISP encapsulation. The P-GWu may communicate with a P-GWc or correspondent using IP, or in other embodiments via GTP-C or GTP-U with LISP encapsulation.

The embodiments have been described with an example of a LISP domain that corresponds to a single S-GW serving area. However, it is possible that the LISP domain can be tied to more than one S-GW serving area in the interest of scaling the S-GWc implementation. There would not be a handoff between S-GWs within the LISP domain exposed to home network P-GWs as the underlying mechanisms in LISP make this unnecessary. In further embodiments, a tracking area could be instantiated as a subset of the LISP domain by the S-GWc and/or a mobile to mobile convergence (MMC) entity that the UE is associated with. In further embodiments, additional EPC components could be distributed and co-located with the S-GWu and P-GWu at the eNodeB. As long as an EID of the UE maps to a correct RLOC for the eNodeB, the associated GWs in a distributed architecture are reachable via the same RLOC, thus there is a 1:1 correspondence between the eNodeBs and any distributed GWs. The distributed GWs are instanced on a per UE basis.

FIG. 9A illustrates connectivity between network devices (NDs) within an exemplary network, as well as three exemplary implementations of the NDs, according to some embodiments of the invention. FIG. 9A shows NDs 900A-H, and their connectivity by way of lines between 900A-900B, 900B-900C, 900C-900D, 900D-900E, 900E-900F, 900F-900G, and 900A-900G, as well as between 900H and each of 900A, 900C, 900D, and 900G. These NDs are physical devices, and the connectivity between these NDs can be wireless or wired (often referred to as a link). An additional line extending from NDs 900A, 900E, and 900F illustrates that these NDs act as ingress and egress points for the network (and thus, these NDs are sometimes referred to as edge NDs; while the other NDs may be called core NDs).

Two of the exemplary ND implementations in FIG. 9A are: 1) a special-purpose network device 902 that uses custom application—specific integrated—circuits (ASICs) and a special-purpose operating system (OS); and 2) a general purpose network device 904 that uses common off-the-shelf (COTS) processors and a standard OS.

The special-purpose network device 902 includes networking hardware 910 comprising compute resource(s) 912 (which typically include a set of one or more processors), forwarding resource(s) 914 (which typically include one or more ASICs and/or network processors), and physical network interfaces (NIs) 916 (sometimes called physical ports), as well as non-transitory machine readable storage media 918 having stored therein networking software 920. A physical NI is hardware in a ND through which a network connection (e.g., wirelessly through a wireless network interface controller (WNIC) or through plugging in a cable to a physical port connected to a network interface controller (NIC)) is made, such as those shown by the connectivity between NDs 900A-H. During operation, the networking software 920 may be executed by the networking hardware 910 to instantiate a set of one or more networking software instance(s) 922. Each of the networking software instance(s) 922, and that part of the networking hardware 910 that executes that network software instance (be it hardware dedicated to that networking software instance and/or time slices of hardware temporally shared by that networking software instance with others of the networking software instance(s) 922), form a separate virtual network element 930A-R. Each of the virtual network element(s) (VNEs) 930A-R includes a control communication and configuration module 932A-R (sometimes referred to as a local control module or control communication module) and forwarding table(s) 934A-R, such that a given virtual network element (e.g., 930A) includes the control communication and configuration module (e.g., 932A), a set of one or more forwarding table(s) (e.g., 934A), and that portion of the networking hardware 910 that executes the virtual network element (e.g., 930A).

The special-purpose network device 902 is often physically and/or logically considered to include: 1) a ND control plane 924 (sometimes referred to as a control plane) comprising the compute resource(s) 912 that execute the control communication and configuration module(s) 932A-R; and 2) a ND forwarding plane 926 (sometimes referred to as a forwarding plane, a data plane, or a media plane) comprising the forwarding resource(s) 914 that utilize the forwarding table(s) 934A-R and the physical NIs 916. By way of example, where the ND is a router (or is implementing routing functionality), the ND control plane 924 (the compute resource(s) 912 executing the control communication and configuration module(s) 932A-R) is typically responsible for participating in controlling how data (e.g., packets) is to be routed (e.g., the next hop for the data and the outgoing physical NI for that data) and storing that routing information in the forwarding table(s) 934A-R, and the ND forwarding plane 926 is responsible for receiving that data on the physical NIs 916 and forwarding that data out the appropriate ones of the physical NIs 916 based on the forwarding table(s) 934A-R.

FIG. 9B illustrates an exemplary way to implement the special-purpose network device 902 according to some embodiments of the invention. FIG. 9B shows a special-purpose network device including cards 938 (typically hot pluggable). While in some embodiments the cards 938 are of two types (one or more that operate as the ND forwarding plane 926 (sometimes called line cards), and one or more that operate to implement the ND control plane 924 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 936 (e.g., a first full mesh coupling the line cards and a second full mesh coupling all of the cards).

Returning to FIG. 9A, the general purpose network device 904 includes hardware 940 comprising a set of one or more processor(s) 942 (which are often COTS processors) and network interface controller(s) 944 (NICs; also known as network interface cards) (which include physical NIs 946), as well as non-transitory machine readable storage media 948 having stored therein software 950. During operation, the processor(s) 942 execute the software 950 to instantiate one or more sets of one or more applications 964A-R. While one embodiment does not implement virtualization, alternative embodiments may use different forms of virtualization. For example, in one such alternative embodiment the virtualization layer 954 represents the kernel of an operating system (or a shim executing on a base operating system) that allows for the creation of multiple instances 962A-R called software containers that may each be used to execute one (or more) of the sets of applications 964A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 954 represents a hypervisor (sometimes referred to as a virtual machine monitor (VMM)) or a hypervisor executing on top of a host operating system, and each of the sets of applications 964A-R is run on top of a guest operating system within an instance 962A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 940, directly on a hypervisor (in which case the unikernel is sometimes described as running within a LibOS virtual machine), or in a software container, embodiments can be implemented fully with unikernels running directly on a hypervisor represented by virtualization layer 954, unikernels running within software containers represented by instances 962A-R, or as a combination of unikernels and the above-described techniques (e.g., unikernels and virtual machines both run directly on a hypervisor, unikernels and sets of applications that are run in different software containers).

The instantiation of the one or more sets of one or more applications 964A-R, as well as virtualization if implemented, are collectively referred to as software instance(s) 952. Each set of applications 964A-R, corresponding virtualization construct (e.g., instance 962A-R) if implemented, and that part of the hardware 940 that executes them (be it hardware dedicated to that execution and/or time slices of hardware temporally shared), forms a separate virtual network element(s) 960A-R. The applications 964A-R may include a distribution manager 965A-R that may encompass the components of a distributed data plane serving gateway (S-GWu), distributed data plane packet-gateway (P-GWu), tunnel routers and similar components and processes as described herein, in particular to the processes describe with reference to FIGS. 6B and 7B.

The virtual network element(s) 960A-R perform similar functionality to the virtual network element(s) 930A-R—e.g., similar to the control communication and configuration module(s) 932A and forwarding table(s) 934A (this virtualization of the hardware 940 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 962A-R corresponding to one VNE 960A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 962A-R to VNEs also apply to embodiments where such a finer level of granularity and/or unikernels are used.

In certain embodiments, the virtualization layer 954 includes a virtual switch that provides similar forwarding services as a physical Ethernet switch. Specifically, this virtual switch forwards traffic between instances 962A-R and the NIC(s) 944, as well as optionally between the instances 962A-R; in addition, this virtual switch may enforce network isolation between the VNEs 960A-R that by policy are not permitted to communicate with each other (e.g., by honoring virtual local area networks (VLANs)).

The third exemplary ND implementation in FIG. 9A is a hybrid network device 906, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 902) could provide for para-virtualization to the networking hardware present in the hybrid network device 906.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 930A-R, VNEs 960A-R, and those in the hybrid network device 906) receives data on the physical NIs (e.g., 916, 946) and forwards that data out the appropriate ones of the physical NIs (e.g., 916, 946). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 9C:
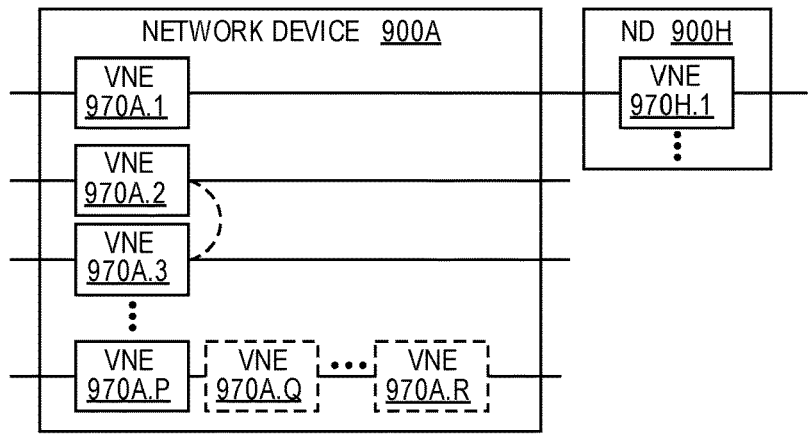
FIG. 9C illustrates various exemplary ways in which virtual network elements (VNEs) may be coupled according to some embodiments of the invention.

FIG. 9C illustrates various exemplary ways in which VNEs may be coupled according to some embodiments of the invention. FIG. 9C shows VNEs 970A.1-970A.P (and optionally VNEs 970A.Q-970A.R) implemented in ND 900A and VNE 970H.1 in ND 900H. In FIG. 9C, VNEs 970A.1-P are separate from each other in the sense that they can receive packets from outside ND 900A and forward packets outside of ND 900A; VNE 970A.1 is coupled with VNE 970H.1, and thus they communicate packets between their respective NDs; VNE 970A.2-970A.3 may optionally forward packets between themselves without forwarding them outside of the ND 900A; and VNE 970A.P may optionally be the first in a chain of VNEs that includes VNE 970A.Q followed by VNE 970A.R (this is sometimes referred to as dynamic service chaining, where each of the VNEs in the series of VNEs provides a different service—e.g., one or more layer 4-7 network services). While FIG. 9C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 9A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 9A may also host one or more such servers (e.g., in the case of the general purpose network device 904, one or more of the software instances 962A-R may operate as servers; the same would be true for the hybrid network device 906; in the case of the special-purpose network device 902, one or more such servers could also be run on a virtualization layer executed by the compute resource(s) 912); in which case the servers are said to be co-located with the VNEs of that ND.

A virtual network is a logical abstraction of a physical network (such as that in FIG. 9A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 9D:
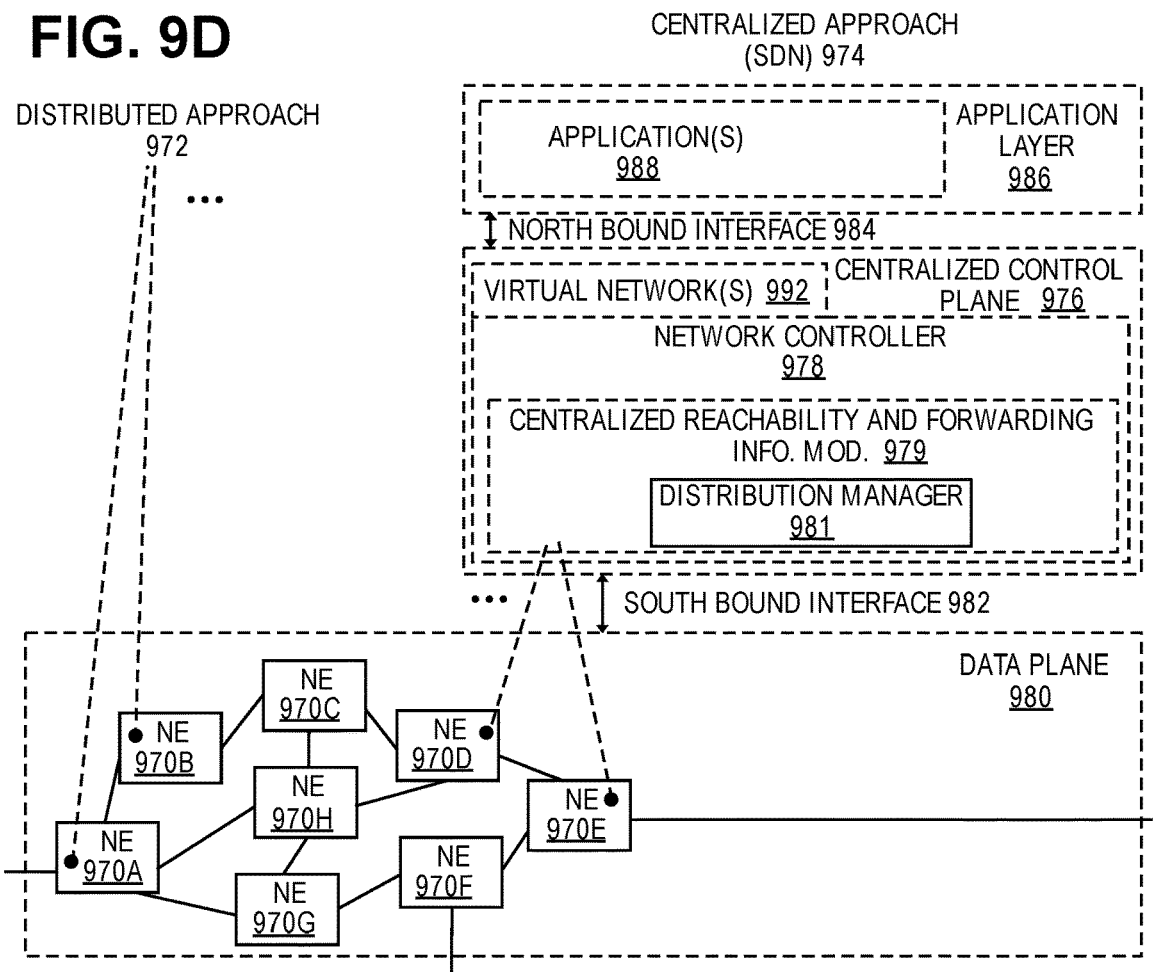
FIG. 9D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 9D illustrates a network with a single network element on each of the NDs of FIG. 9A, and within this straight forward approach contrasts a traditional distributed approach (commonly used by traditional routers) with a centralized approach for maintaining reachability and forwarding information (also called network control), according to some embodiments of the invention. Specifically, FIG. 9D illustrates network elements (NEs) 970A-H with the same connectivity as the NDs 900A-H of FIG. 9A.

FIG. 9D illustrates that the distributed approach 972 distributes responsibility for generating the reachability and forwarding information across the NEs 970A-H; in other words, the process of neighbor discovery and topology discovery is distributed.

For example, where the special-purpose network device 902 is used, the control communication and configuration module(s) 932A-R of the ND control plane 924 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE)) that communicate with other NEs to exchange routes, and then selects those routes based on one or more routing metrics. Thus, the NEs 970A-H (e.g., the compute resource(s) 912 executing the control communication and configuration module(s) 932A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 924. The ND control plane 924 programs the ND forwarding plane 926 with information (e.g., adjacency and route information) based on the routing structure(s). For example, the ND control plane 924 programs the adjacency and route information into one or more forwarding table(s) 934A-R (e.g., Forwarding Information Base (FIB), Label Forwarding Information Base (LFIB), and one or more adjacency structures) on the ND forwarding plane 926. For layer 2 forwarding, the ND can store one or more bridging tables that are used to forward data based on the layer 2 information in that data. While the above example uses the special-purpose network device 902, the same distributed approach 972 can be implemented on the general purpose network device 904 and the hybrid network device 906.

FIG. 9D illustrates that a centralized approach 974 (also known as software defined networking (SDN)) that decouples the system that makes decisions about where traffic is sent from the underlying systems that forwards traffic to the selected destination. The illustrated centralized approach 974 has the responsibility for the generation of reachability and forwarding information in a centralized control plane 976 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 976 has a south bound interface 982 with a data plane 980 (sometime referred to the infrastructure layer, network forwarding plane, or forwarding plane (which should not be confused with a ND forwarding plane)) that includes the NEs 970A-H (sometimes referred to as switches, forwarding elements, data plane elements, or nodes). The centralized control plane 976 includes a network controller 978, which includes a centralized reachability and forwarding information module 979 that determines the reachability within the network and distributes the forwarding information to the NEs 970A-H of the data plane 980 over the south bound interface 982 (which may use the OpenFlow protocol). Thus, the network intelligence is centralized in the centralized control plane 976 executing on electronic devices that are typically separate from the NDs.

For example, where the special-purpose network device 902 is used in the data plane 980, each of the control communication and configuration module(s) 932A-R of the ND control plane 924 typically include a control agent that provides the VNE side of the south bound interface 982. In this case, the ND control plane 924 (the compute resource(s) 912 executing the control communication and configuration module(s) 932A-R) performs its responsibility for participating in controlling how data (e.g., packets) is to be routed (e.g., the next hop for the data and the outgoing physical NI for that data) through the control agent communicating with the centralized control plane 976 to receive the forwarding information (and in some cases, the reachability information) from the centralized reachability and forwarding information module 979 (it should be understood that in some embodiments of the invention, the control communication and configuration module(s) 932A-R, in addition to communicating with the centralized control plane 976, may also play some role in determining reachability and/or calculating forwarding information—albeit less so than in the case of a distributed approach; such embodiments are generally considered to fall under the centralized approach 974, but may also be considered a hybrid approach). The control communication and configuration module 932A-R may implement a distribution manager 933A-R that may encompass the components of a distributed data plane serving gateway (S-GWu), distributed data plane packet-gateway (P-GWu), tunnel routers and similar components and processes as described herein, in particular to the processes describe with reference to FIGS. 6B and 7B.

While the above example uses the special-purpose network device 902, the same centralized approach 974 can be implemented with the general purpose network device 904 (e.g., each of the VNE 960A-R performs its responsibility for controlling how data (e.g., packets) is to be routed (e.g., the next hop for the data and the outgoing physical NI for that data) by communicating with the centralized control plane 976 to receive the forwarding information (and in some cases, the reachability information) from the centralized reachability and forwarding information module 979; it should be understood that in some embodiments of the invention, the VNEs 960A-R, in addition to communicating with the centralized control plane 976, may also play some role in determining reachability and/or calculating forwarding information—albeit less so than in the case of a distributed approach) and the hybrid network device 906. In fact, the use of SDN techniques can enhance the NFV techniques typically used in the general purpose network device 904 or hybrid network device 906 implementations as NFV is able to support SDN by providing an infrastructure upon which the SDN software can be run, and NFV and SDN both aim to make use of commodity server hardware and physical switches.

FIG. 9D also shows that the centralized control plane 976 has a north bound interface 984 to an application layer 986, in which resides application(s) 988. The centralized control plane 976 has the ability to form virtual networks 992 (sometimes referred to as a logical forwarding plane, network services, or overlay networks (with the NEs 970A-H of the data plane 980 being the underlay network)) for the application(s) 988. Thus, the centralized control plane 976 maintains a global view of all NDs and configured NEs/VNEs, and it maps the virtual networks to the underlying NDs efficiently (including maintaining these mappings as the physical network changes either through hardware (ND, link, or ND component) failure, addition, or removal). The control communication and configuration module 979 or applications 988 may implement a distribution manager 981 that may encompass the components of a distributed data plane serving gateway (S-GWu), distributed data plane packet-gateway (P-GWu), tunnel routers and similar components and processes as described herein, in particular to the processes describe with reference to FIGS. 6B and 7B.

While FIG. 9D shows the distributed approach 972 separate from the centralized approach 974, the effort of network control may be distributed differently or the two combined in certain embodiments of the invention. For example: 1) embodiments may generally use the centralized approach (SDN) 974, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 974, but may also be considered a hybrid approach.

While FIG. 9D illustrates the simple case where each of the NDs 900A-H implements a single NE 970A-H, it should be understood that the network control approaches described with reference to FIG. 9D also work for networks where one or more of the NDs 900A-H implement multiple VNEs (e.g., VNEs 930A-R, VNEs 960A-R, those in the hybrid network device 906). Alternatively or in addition, the network controller 978 may also emulate the implementation of multiple VNEs in a single ND. Specifically, instead of (or in addition to) implementing multiple VNEs in a single ND, the network controller 978 may present the implementation of a VNE/NE in a single ND as multiple VNEs in the virtual networks 992 (all in the same one of the virtual network(s) 992, each in different ones of the virtual network(s) 992, or some combination). For example, the network controller 978 may cause an ND to implement a single VNE (a NE) in the underlay network, and then logically divide up the resources of that NE within the centralized control plane 976 to present different VNEs in the virtual network(s) 992 (where these different VNEs in the overlay networks are sharing the resources of the single VNE/NE implementation on the ND in the underlay network).

Figure 9E:
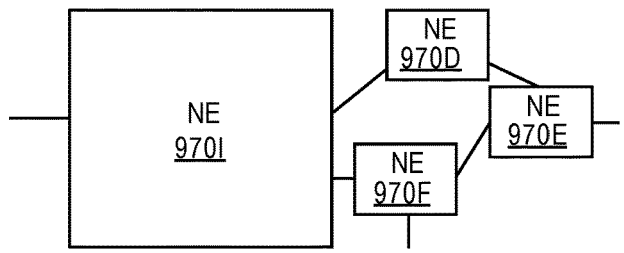
FIG. 9E illustrates the simple case of where each of the NDs implements a single NE, but a centralized control plane has abstracted multiple of the NEs in different NDs into (to represent) a single NE in one of the virtual network(s), according to some embodiments of the invention.
Figure 9F:
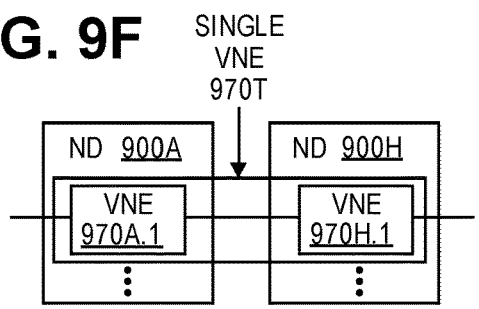
FIG. 9F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 9E and 9F respectively illustrate exemplary abstractions of NEs and VNEs that the network controller 978 may present as part of different ones of the virtual networks 992. FIG. 9E illustrates the simple case of where each of the NDs 900A-H implements a single NE 970A-H (see FIG. 9D), but the centralized control plane 976 has abstracted multiple of the NEs in different NDs (the NEs 970A-C and G-H) into (to represent) a single NE 970I in one of the virtual network(s) 992 of FIG. 9D, according to some embodiments of the invention. FIG. 9E shows that in this virtual network, the NE 970I is coupled to NE 970D and 970F, which are both still coupled to NE 970E.

FIG. 9F illustrates a case where multiple VNEs (VNE 970A.1 and VNE 970H.1) are implemented on different NDs (ND 900A and ND 900H) and are coupled to each other, and where the centralized control plane 976 has abstracted these multiple VNEs such that they appear as a single VNE 970T within one of the virtual networks 992 of FIG. 9D, according to some embodiments of the invention. Thus, the abstraction of a NE or VNE can span multiple NDs.

While some embodiments of the invention implement the centralized control plane 976 as a single entity (e.g., a single instance of software running on a single electronic device), alternative embodiments may spread the functionality across multiple entities for redundancy and/or scalability purposes (e.g., multiple instances of software running on different electronic devices).

Figure 10:
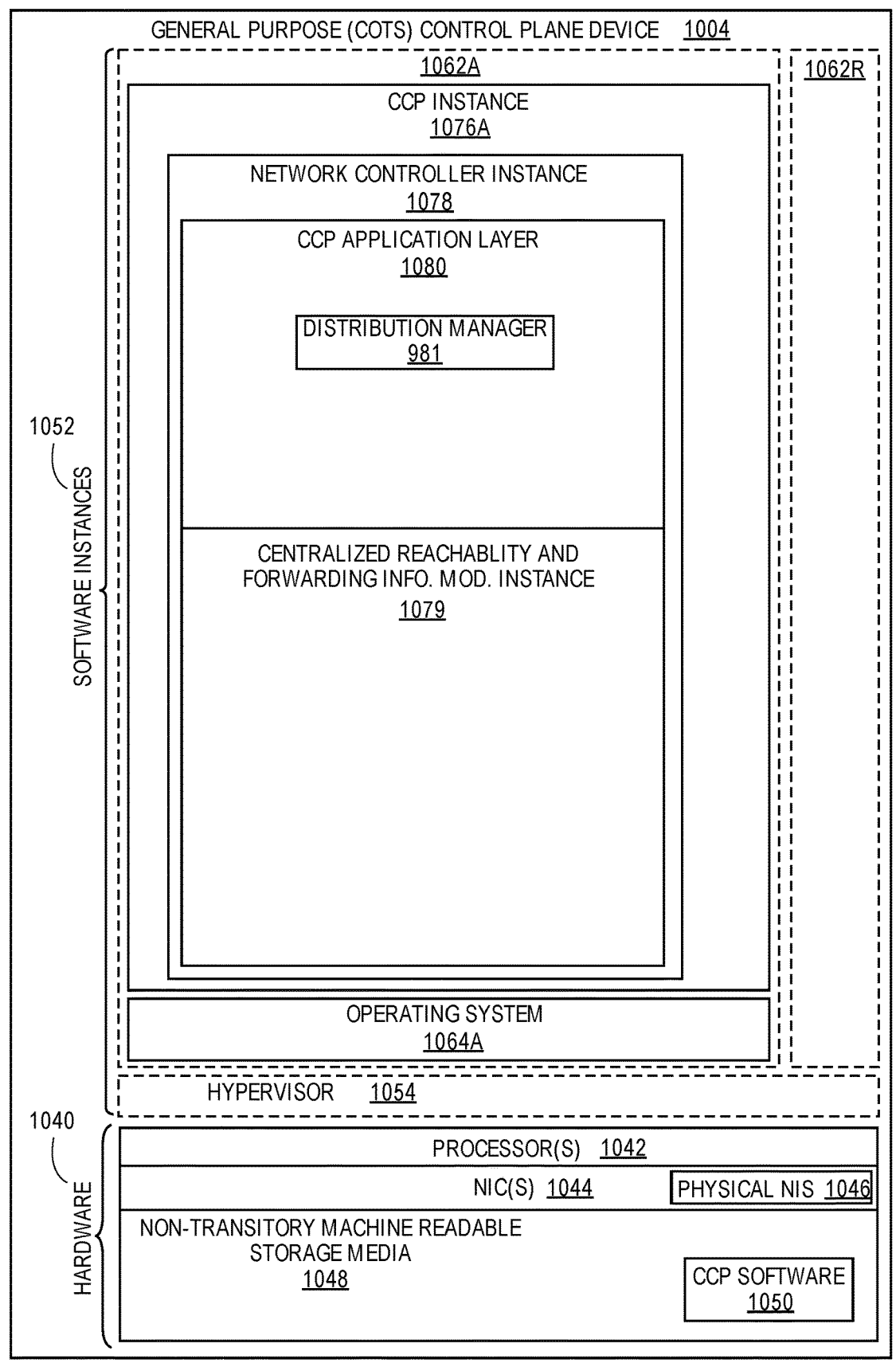
FIG. 10 illustrates a general purpose control plane device with centralized control plane (CCP) software, according to some embodiments of the invention.

Similar to the network device implementations, the electronic device(s) running the centralized control plane 976, and thus the network controller 978 including the centralized reachability and forwarding information module 979, may be implemented a variety of ways (e.g., a special purpose device, a general-purpose (e.g., COTS) device, or hybrid device). These electronic device(s) would similarly include compute resource(s), a set or one or more physical NICs, and a non-transitory machine-readable storage medium having stored thereon the centralized control plane software. For instance, FIG. 10 illustrates, a general purpose control plane device 1004 including hardware 1040 comprising a set of one or more processor(s) 1042 (which are often COTS processors) and network interface controller(s) 1044 (NICs; also known as network interface cards) (which include physical NIs 1046), as well as non-transitory machine readable storage media 1048 having stored therein centralized control plane (CCP) software 1050.

In embodiments that use compute virtualization, the processor(s) 1042 typically execute software to instantiate a virtualization layer 1054 (e.g., in one embodiment the virtualization layer 1054 represents the kernel of an operating system (or a shim executing on a base operating system) that allows for the creation of multiple instances 1062A-R called software containers (representing separate user spaces and also called virtualization engines, virtual private servers, or jails) that may each be used to execute a set of one or more applications; in another embodiment the virtualization layer 1054 represents a hypervisor (sometimes referred to as a virtual machine monitor (VMM)) or a hypervisor executing on top of a host operating system, and an application is run on top of a guest operating system within an instance 1062A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 1040, directly on a hypervisor represented by virtualization layer 1054 (in which case the unikernel is sometimes described as running within a LibOS virtual machine), or in a software container represented by one of instances 1062A-R). Again, in embodiments where compute virtualization is used, during operation an instance of the CCP software 1050 (illustrated as CCP instance 1076A) is executed (e.g., within the instance 1062A) on the virtualization layer 1054. In embodiments where compute virtualization is not used, the CCP instance 1076A is executed, as a unikernel or on top of a host operating system, on the "bare metal" general purpose control plane device 1004. The instantiation of the CCP instance 1076A, as well as the virtualization layer 1054 and instances 1062A-R if implemented, are collectively referred to as software instance(s) 1052.

In some embodiments, the CCP instance 1076A includes a network controller instance 1078. The network controller instance 1078 includes a centralized reachability and forwarding information module instance 1079 (which is a middleware layer providing the context of the network controller 978 to the operating system and communicating with the various NEs), and an CCP application layer 1080 (sometimes referred to as an application layer) over the middleware layer (providing the intelligence required for various network operations such as protocols, network situational awareness, and user—interfaces). At a more abstract level, this CCP application layer 1080 within the centralized control plane 976 works with virtual network view(s) (logical view(s) of the network) and the middleware layer provides the conversion from the virtual networks to the physical view. The CCP application layer 1080 may implement a distribution manager 981 that may encompass the components of a distributed data plane serving gateway (S-GWu), distributed data plane packet-gateway (P-GWu), tunnel routers and similar components and processes as described herein, in particular to the processes describe with reference to FIGS. 6B and 7B.

The centralized control plane 976 transmits relevant messages to the data plane 980 based on CCP application layer 1080 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 980 may receive different messages, and thus different forwarding information. The data plane 980 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 980, the packet (or a subset of the packet header and content) is typically forwarded to the centralized control plane 976. The centralized control plane 976 will then program forwarding table entries into the data plane 980 to accommodate packets belonging to the flow of the unknown packet. Once a specific forwarding table entry has been programmed into the data plane 980 by the centralized control plane 976, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method implemented by a network device in a cellular communication network with a distributed data plane serving gateway (S-GWu) at an evolved universal terrestrial radio access network (E-UTRAN) node B (eNodeB), the method to enable an ingress tunnel router to forward traffic between devices connected to the cellular communication network via location identifier separation protocol (LISP) to enable mobility within the cellular communication network without anchor points, the method comprising:
   receiving a packet originating from a first device;
   determining whether the received packet is General packet radio service (GPRS) tunneling protocol (GTP) user plane (GTP-U) encapsulated;
   retrieving an endpoint identifier (EID) of a destination address of a nested header of the received packet, where the received packet is determined to be GTP-U encapsulated;
   determining whether the received packet is GTP encapsulated;
   retrieving the EID of a destination address of an outer header of the received packet, wherein the received packet is determined not to be GTP encapsulated;
   resolving a routing locator (RLOC) of the retrieved EID, wherein a LISP map server manages a database of EID and RLOC mappings that are determined from communication with tunnel routers, the LISP map server receives EID information from the tunnel routers that are stored in the database and associated with the respective tunnel routers;
   encapsulating the packet with LISP using the RLOC;
   forwarding the packet via LISP to an egress tunnel router; and
forwarding the packet to a GTP control component based on a GTP-control (GTP-C) address in an outer packet header, where the received packet is determined not to be GTP-U encapsulated.

2. The method of claim 1, where the egress tunnel router RLOC is associated with the EID of a user equipment.

3. The method of claim 1, where the egress tunnel router RLOC is associated with the EID of a control plane serving gateway (S-GWc).

4. A method implemented by a network device in a cellular communication network with a distributed data plane serving gateway (S-GWu) at an evolved universal terrestrial radio access network (E-UTRAN) node B (eNodeB), the method to enable an ingress tunnel router to forward traffic between devices connected to the cellular communication network via location identifier separation protocol (LISP) to enable mobility within the cellular communication network without anchor points, the method comprising:
   receiving a packet originating from a first device via the distributed S-GWu;
   retrieving an endpoint identifier (EID) of a destination address of the packet from a header of the received packet;
   determining whether the received packet is GTP encapsulated;
   retrieving the EID of a destination address of an outer header of the received packet, wherein the received packet is determined not to be GTP encapsulated;
   resolving a routing locator (RLOC) of the retrieved EID, wherein a LISP map server manages a database of EID and RLOC mappings that are determined from communication with tunnel routers, the LISP map server receives EID information from the tunnel routers that are stored in the database and associated with the respective tunnel routers;
   encapsulating the packet with LISP using the RLOC;
   forwarding the packet via LISP to an egress tunnel router; and
forwarding the packet to a GTP control component based on a GTP-control (GTP-C) address in an outer packet header, where the received packet is determined not to be GTP-U encapsulated.

5. The method of claim 4, where the egress tunnel router is associated with the RLOC of a user equipment.

6. The method of claim 4, where the egress tunnel router is associated with the RLOC of a control plane serving gateway (S-GWc).

7. A network device in a cellular communication network with a distributed data plane serving gateway (S-GWu) at an evolved universal terrestrial radio access network (E-UTRAN) node B (eNodeB) is configured to execute a method to enable an ingress tunnel router to forward traffic between devices connected to the cellular communication network via location identifier separation protocol (LISP) to enable mobility within the cellular communication network without anchor points, the network device comprising:
- a non-transitory computer-readable medium having stored therein a distribution manager; and
- a processor coupled to the non-transitory computer-readable medium, the processor to execute the distribution manager, the distribution manager to receive a packet originating from a first device, to determine whether the received packet is general packet radio service (GPRS) tunneling protocol (GTP) user plane (GTP-U) encapsulated, to retrieve an endpoint identifier (EID) of a destination address of a nested header of the received packet, where the received packet is determined to be GTP-U encapsulated, to resolve a routing locator (RLOC) of the retrieved EID, to encapsulate the packet with LISP using the RLOC, and to forward the packet via LISP to an egress tunnel router, wherein a LISP map server manages a database of EID and RLOC mappings that are determined from communication with tunnel routers, the LISP map server receives EID information from the tunnel routers that are stored in the database and associated with the respective tunnel routers, and wherein the distribution manager to determine whether the received packet is GTP encapsulated, and to retrieve the EID of a destination address of an outer header of the received packet, where the received packet is determined not to be GTP encapsulated, and wherein the distribution manager to forward the packet to a GTP control component based on a GTP-control (GTP-C) address in an outer packet header, where the received packet is determined not to be GTP-U encapsulated.

8. The network device of claim 7, where the egress tunnel router RLOC is associated with the EID of a user equipment.

9. The network device of claim 7, where the egress tunnel router RLOC is associated with the EID of a control plane serving gateway (S-GWc).

10. A network device in a cellular communication network with a distributed data plane serving gateway (S-GWu) at an evolved universal terrestrial radio access network (E-UTRAN) node B (eNodeB) is configured to execute a method to enable an ingress tunnel router to forward traffic between devices connected to the cellular communication network via location identifier separation protocol (LISP) to enable mobility within the cellular communication network without anchor points, the network device comprising:
- a non-transitory computer-readable medium having stored therein a distribution manager; and
- a processor coupled to the non-transitory computer-readable medium, the processor to execute the distribution manager, the distribution manager to receive a packet originating from a first device via the distributed S-GWu, to retrieve an endpoint identifier (EID) of a destination address of the packet from a header of the received packet, to resolve a routing locator (RLOC) of the retrieved EID, to encapsulate the packet with LISP using the RLOC, and to forward the packet via LISP to an egress tunnel router, wherein a LISP map server manages a database of EID and RLOC mappings that are determined from communication with tunnel routers, the LISP map server receives EID information from the tunnel routers that are stored in the database and associated with the respective tunnel routers, and wherein the distribution manager to determine whether the received packet is GTP encapsulated, and to retrieve the EID of a destination address of an outer header of the received packet, where the received packet is determined not to be GTP encapsulated, and wherein the distribution manager to forward the packet to a GTP control component based on a GTP-control (GTP-C) address in an outer packet header, where the received packet is determined not to be GTP-U encapsulated.

11. The network device of claim 10, where the egress tunnel router is associated with the RLOC of a user equipment.

12. The network device of claim 10, where the egress tunnel router is associated with the RLOC of a control plane serving gateway (S-GWc).

* * * * *